March 16, 1965 K. A. OESTERHELD 3,173,828
METHOD FOR CORRUGATING SHEETS OF ASBESTOS CEMENT
Filed July 27, 1961 2 Sheets-Sheet 1

INVENTOR
K. A. Oesterheld
By Lowry & Rinehart
ATTYS.

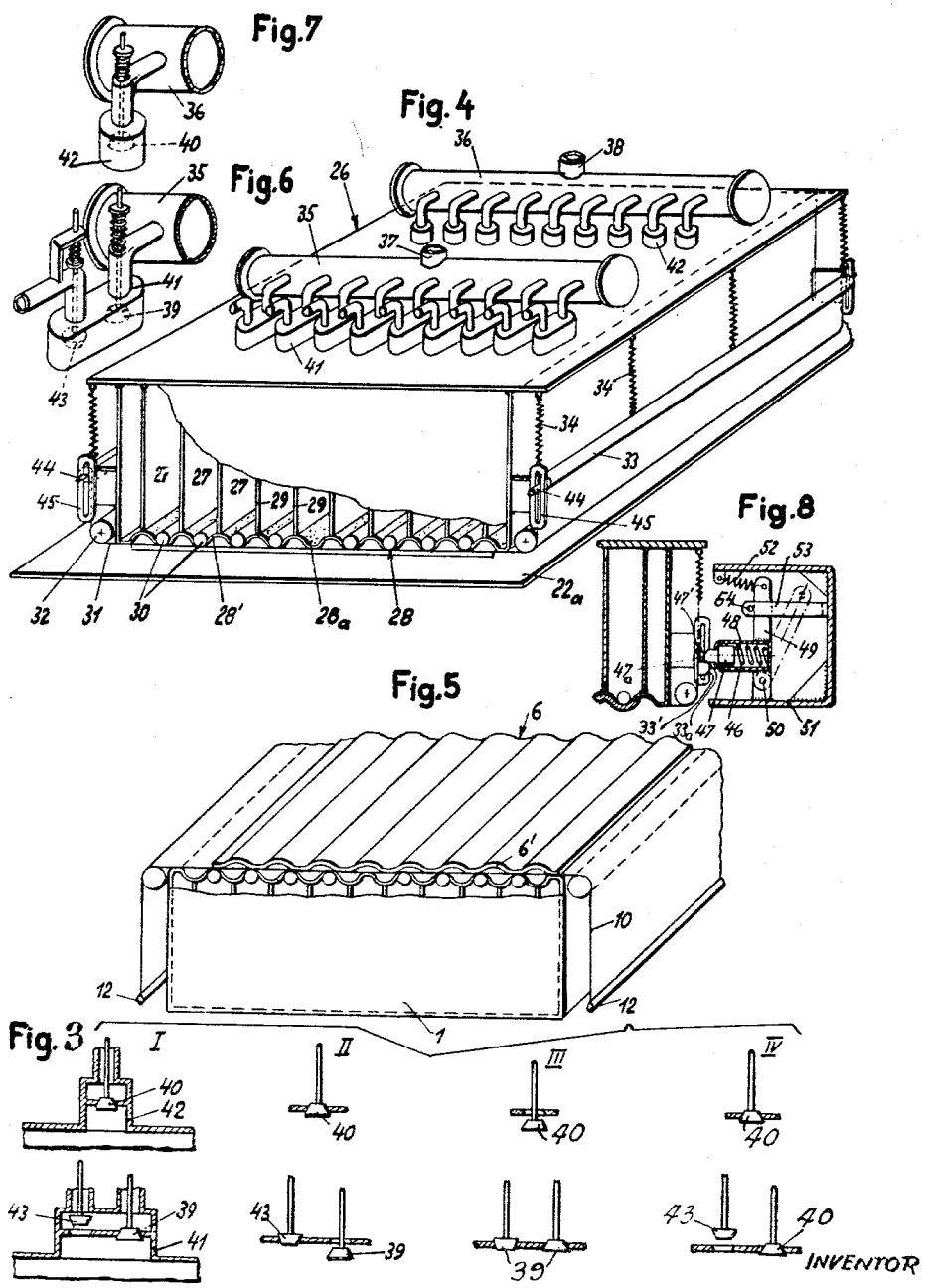

United States Patent Office 3,173,828
Patented Mar. 16, 1965

3,173,828
METHOD FOR CORRUGATING SHEETS OF ASBESTOS CEMENT
Karl Adolf Oesterheld, Luthe Via Wunstorf, Hannover, Germany, assignor to Eurasbest A.G., Basel, Switzerland, a firm
Filed July 27, 1961, Ser. No. 127,202
Claims priority, application Germany, July 29, 1960, O 7,551
3 Claims. (Cl. 162—116)

This invention relates to a method for corrugating sheets of asbestos cement.

A method of and an apparatus for corrugating sheets of asbestos cement are disclosed in my prior application Serial No. 34,486, filed June 7, 1960.

This invention relates to modifications of the method and apparatus disclosed in the above-mentioned application.

The method according to the aforesaid application for corrugating prefabricated fresh sheets of asbestos cement on a rigid suction box having a corrugated cover provided with suction holes using a flexible layer yieldably stretched over the perforated corrugated cover, on which layer a sheet of asbestos cement is placed and sucked against the corrugated cover of the suction box divided into separate suction chambers by suction air fed successively to the individual suction chambers of the suction box, has proved very satisfactory in practice for the production of corrugated sheets of normal thickness. The sheets of asbestos cement corrugated solely by the action of vacuum turn out entirely free from cracks or flaws both on the upper side as well as on the under side. They have a structure tightly coherent at all points and present the advantage of an absolutely accurate profile.

When corrugating sheets of asbestos cement of abnormal thickness on the mechanically operated corrugating apparatus hitherto known, cracks or flaws occur on the outer side of the crest of the corrugations. Even when using the method according to the application mentioned at the beginning cracks or flaws cannot always be avoided when corrugating excessively thick sheets of asbestos cement. The reason is obviously that the material of the sheets of asbestos cement undergoes strong expansion or stretching in the outer surface, owing to the great thickness of the sheets, when being drawn over the corrugation crests of the corrugated cover of the suction box.

It has hitherto been endeavoured in practice to overcome this difficulty of corrugating sheets of great thickness on mechanically acting shaping apparatus by adding to the asbestos cement material, from which the sheets to be corrugated are produced on the shaping roll admixtures of organic substances, such as cellulose, which admixtures may amount to as much as 40% of the gross weight of the asbestos material. These additional organic admixtures impart a greater plasticity to the sheet material and enable better, in some cases even crack-free or flawless corrugations, but reduce to a considerable extent the resistance of the finished products to atmospheric influence and aging effects. For this reason the use of cellulose is not admissible in the production of asbestos cement corrugated sheets according to the German and international standards.

It has also been endeavoured to obtain better results when corrugating abnormally thick asbestos cement sheets, by moistening the sheets. The plasticity of the sheet material can certainly be increased by moistening, but one has to put up with the serious objection of a considerable reduction in the strength of the finished sheet. The sheet material is swelled by the moistening liquid, which has an unfavourable effect in that it increases the volume of pores and increases to an undesirable extent the capacity of the finished corrugated sheet for absorbing water.

It is the object of the present invention to overcome these disadvantages, enable the suction method according to the application mentioned at the beginning to be used for corrugating abnormally thick sheets of asbestos cement without adding organic admixtures and without moistening the sheets to be corrugated, and to provide an efficient method of corrugating prefabricated fresh sheets of asbestos cement on a rigid suction box having a corrugated cover with suction holes, using a flexible layer yieldably stretched over the corrugated cover and on which a sheet of asbestos cement is placed and sucked against the corrugated over of the suction box divided into separate suction chambers successively placed under vacuum and thereby corrugated, and apparatus for carrying out that method, which method comprises the steps of providing a sheet of asbestos cement, before it is placed on the flexible layer, with preliminary corrugations the spacing of which is chosen slightly larger than the spacing of the corrugations on the corrugated cover, placing the preliminarily corrugated sheet of asbestos cement on the flexible layer yieldably stretched over the corrugated cover in such a manner that when the flexible layer is sucked against the corrugated cover zone by zone, the sheet of asbestos cement in the region of the corrugation crests actually to be formed is brought to bear snugly against the corrugation crests of the corrugated cover not only with the flexible layer from the outer longitudinal edges thereof but also partly from the middle strip first sucked against the corrugated cover and then from the corrugations given their finished shape at the preceding application of vacuum, the sheet of asbestos cement thereby sliding on the flexible layer in the opposite direction to the direction in which the flexible layer is drawn in.

Whereas in the method according to the application mentioned at the beginning, the fresh sheet of asbestos cement is drawn only from the outside towards the inside by the application of vacuum, the sheet of asbestos cement is according to the present invention also drawn from the other side when forming the corrugation crests, that is from the inside towards the outside to a slight extent. During this procedure the sheet of asbestos cement wraps itself around the corrugation crests of the corrugated suction box cover without the material of the sheet being stretched to an excessive extent. It is possible in this manner to corrugate sheets of asbestos cement of abnormal thickness without any cracks or flaws forming on the crests of the corrugations.

For forming large and medium sized corrugations in thick-walled asbestos cement sheets the method according to the invention can advantageously be carried out in that the fresh sheet of asbestos cement is fed to the suction box on a conveyor band provided with longitudinal ribs for forming preliminarily bulged strip sections in the sheet and is transferred in the preliminarily corrugated state onto the taut flexible layer with the aid of a suction die having on its operative surface trough-shaped longitudinal depressions fitting the strip sections of the sheet of asbestos cement so that the upwardly bulged longitudinal strip sections of the sheet of asbestos cement rest hollow on the flexible layer and their corrugation crests are opposite the corrugation crests of the corrugated cover which effect the formation of the corrugations during the subsequent application of suction.

The apparatus for carrying out this method comprises a feeding device for fresh sheets of asbestos cement consisting of an endless conveyor band provided with spaced longitudinal ribs, a suction die transferring the individual sheets of asbestos cement on to a flexible layer stretched over the corrugated cover of a suction box, trough-shaped depressions arranged in the working surface of the suction die and corresponding with the spacing of the conveyor band ribs and fitting the preliminary bulges of the sheets of asbestos cement formed by said ribs, the spacing of the ribs and of the trough-shaped depressions being greater than the spacing of the crests of the corrugations on the corrugated cover of the suction box.

When producing small and very small corrugations in excessively thick sheets of asbestos cement, the extra width obtained by the preliminary weak forming of the narrow strip sections is not sufficient to draw the sheet of asbestos cement over the crests of the corrugations of the corrugated box cover without stretching because of the many corrugations to be formed for which the ribs of the conveyor band would have to be situated so close together that appreciable corrugating of thick walled sheets by the ribs of the conveyor band could not be produced. This is taken into consideration according to a further suggestion of the invention in that the fresh sheet of asbestos cement is preliminarily corrugated by a suction die, which is fed with suction air successively one zone after the other and transfers the sheet from a feeding device on to the flexible layer yieldably stretched over the corrugated cover of the suction box, and is brought onto the flexible layer so that, of the corrugations preliminarily formed in wide strips, first the crest of the middle corrugation is opposite the middle corrugation of the corrugated cover of the suction box in symmetrical arrangement and, as the flexible layer is drawn in, the corrugation crests of the other corrugations are successively brought into symmetrical positions to those corrugation crests of the suction box cover against which the flexible layer is sucked together with the sheet of asbestos cement at the subsequent application of suction air in the suction chambers.

For carrying out this method an apparatus is used wherein a suction die is arranged for transferring the fresh sheet of asbestos cement from a smooth faced feeding device on to the corrugating suction box and consists of a rigid suction box divided into separate suction chambers and having a perforated bottom corrugated according to the desired corrugation and an air permeable flexible layer, such as a non-expansible fabric layer, elastically yieldably stretched around this bottom by means of controllable stretching elements, the suction die is equipped with two suction cylinders one of which is designed for weak suction for picking up and holding the sheet of asbestos cement, while the second is designed for strong vacuum for producing preliminary corrugations, the two suction cylinders being connected with the individual suction chambers by means of connecting pieces, valves are fitted in the connection pieces and so arranged and constructed that the placing under weak vacuum of all the suction chambers and the opening of all suction chambers to the open air takes place simultaneously, whereas the placing of the individual suction chambers under strong vacuum takes place at intervals one after the other, and locking devices are provided for temporarily blocking the stretching elements acting on the flexible layer of the suction die and arresting the stretching elements in stressed position until the suction die has been completely lifted off the preliminarily corrugated sheet of asbestos cement placed on the corrugating suction box.

The suction die forming the preliminary corrugations in the sheet of asbestos cement is accordingly so constructed that it operates substantially in the same manner as the suction box corrugating the sheet of asbestos cement to the final shape. As no special requirements regarding accuracy have to be met when forming the corrugations, the controllable elements provided for stretching the flexible layer can be spring or rubber pulling devices. However, it is absolutely necessary that, when shutting off the vacuum for depositing the preliminarily corrugated sheet of asbestos cement on the flexible layer of the suction box, the spring or rubber pulling devices are maintained in their stretching positions until the suction die has deposited and released completely the preliminarily corrugated sheet of asbestos cement on the flexible layer stretched over the corrugated cover of the suction box.

The apparatus used in carrying the method into effect will now be described by way of example and with reference to the accompanying schematic drawings, in which:

FIG. 3 shows vertical sections illustrating the positions of the valves coordinated with each suction chamber of the suction die according to FIG. 4 during the different working phases;

FIG. 4 is a perspective view of a suction die, parts being broken away to show certain structural details, with which the sheet of asbestos cement to be corrugated is picked up from a smooth surfaced feeding device, preliminarily corrugated and transferred in preliminarily corrugated state on to the flexible layer yieldably stretched over the suction box;

FIG. 5 is a perspective view of the suction box with the sheet of asbestos cement placed on the flexible layer and preliminarily corrugated by the suction die shown in FIG. 4, before the beginning of the corrugating operation;

FIGS. 6 and 7 are perspective views of valves coordinated with each individual suction chamber of the suction die according to FIG. 4, and FIG. 8 is a vertical cross-section through one locking device for temporarily blocking in stretching position the stretching elements which engage the air-permeable fabric layer guided around the perforated bottom surface of the suction die according to FIG. 4.

Figure 1:
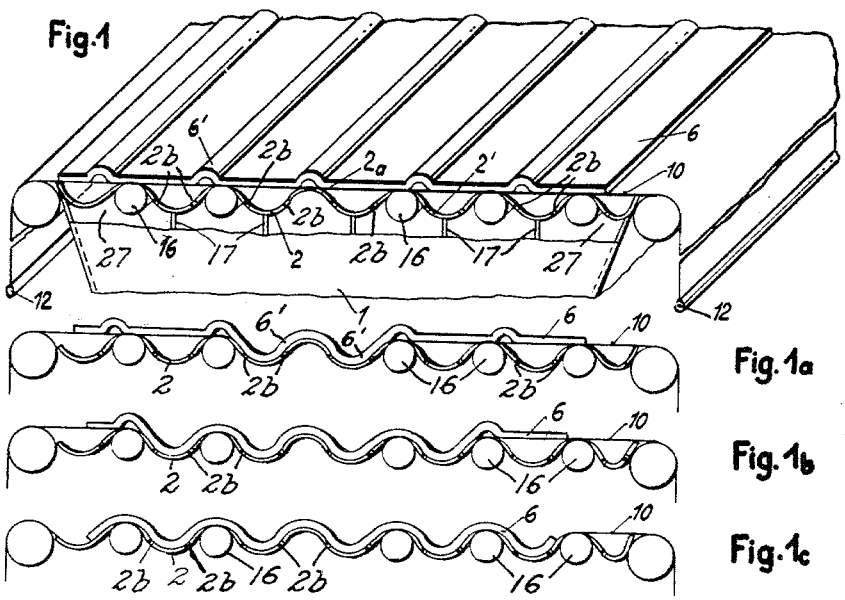
FIG. 1 is a partial perspective view of a suction box with a flexible layer stretched thereover, in the position occupied before the commencement of a corrugating procedure, which layer carries a preliminarily corrugated sheet of asbestos cement.
Figure 1A:
FIGS. 1a, 1b and 1c are end views showing three individual phases of corrugating.

FIG. 1 shows a sheet-metal suction box 1 having a corrugated cover 2 formed by rollers 16 fixedly or rotatably mounted on the end walls of the box 1 and by strips 2′ of sheet metal provided with suction holes 2b arranged in trough-shape between these rollers 16. The interior of the suction box 1 is divided, by means of vertical partitions 17 extending parallel to the longitudinal walls of the suction box 1, into a plurality of suction chambers 27 also shown in FIG. 3, the number of which is by one greater than the number of corrugations to be formed in the sheet. The middle section of the corrugated cover 2 consists of a corrugated sheet-metal strip 2a perforated as at 2b extending over two corrugations and under the corrugation crest of which there is a separate suction chamber. An air-permeable flexible layer 10, which may be a non-expanding fabric layer made of non-breakable plastic threads, is stretched over the box cover 2.

The flexible layer 10 is held stretched taut over the corrugated cover 2 by weights 12 preferably exchangeably fitted on or engaging its edges or by adjusting stretching means, so that it is capable of carrying a sheet of asbestos cement 6, placed on it, without yielding.

Figure 2:
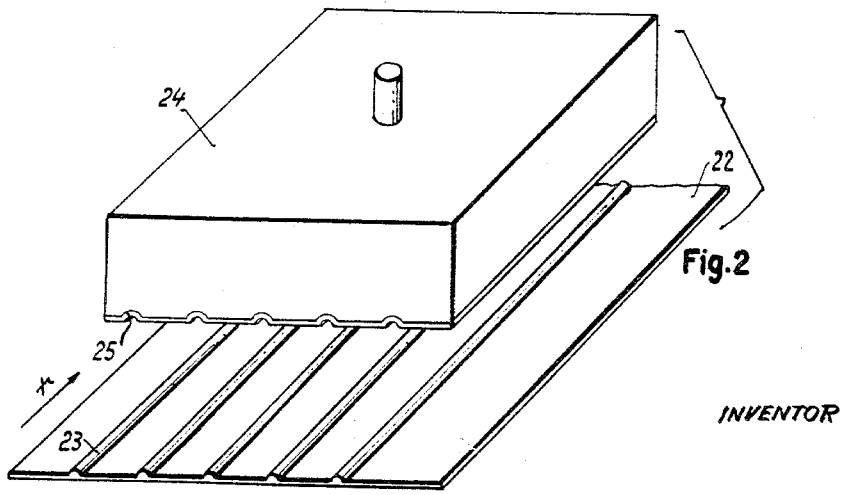
FIG. 2 is a partial perspective view of a conveyor band on which the preliimnarily corrugated sheet of asbestos cement is carried to the suction box illustrated in this figure.

The thick-walled sheets of asbestos cement 6 to be corrugated are fed to one longitudinal side of the suction box 1 on an endless conveyor band 22 which is driven intermittently in the direction of arrow x shown in FIG. 2. The conveyor band 22, which is made for example of rubber-impregnated fabric, is provided on its outer surface with longitudinal ribs 23, for example rubber beads. When a sheet of asbestos cement 6 coming from a shaping roll, not shown, in plastic mouldable state, is placed on the conveyor band 22, it bulges upwards in the regions of the longitudinal ribs 23 and preliminarily bulged strip sections 6′ are being formed (FIG. 1). In this preliminarily corrugated state the sheet of asbestos cement 6 is removed from the conveyor band 22 with the aid of a suction die 24 (FIG. 2) which has on its operating surface troughs 25 corresponding to the bulged strip sections 6' of the sheet of asbestos cement 6 and is transferred onto the flexible layer 10 tightly stretched over the corrugated cover 2 of the suction box 1.

The spacing of the longitudinal ribs 23 of the conveyor band 22 is chosen slightly larger than the spacing of the corrugation crests on the corrugated cover 2 of the suction box 1. As a result, after the preliminarily corrugated sheet of asbestos cement 6 has been placed on the flexible layer 10 stretched over the corrugated cover 2 in the manner shown in FIG. 1, the middle preliminarily bulged strip section 6' is exactly opposite the middle corrugation crest of the corrugated cover 2. The two bulged strip sections adjacent the middle bulged strip section are displaced a small distance in outward direction in relation to the corrugation crests of the corrugated cover 2 coordinated with them and the next following preliminarily bulged strip sections are displaced a slightly greater distance in outward direction in relation to the corrugation crests of the corrugated cover 2 coordinated with them.

If now, as it is the case in the patent application mentioned at the beginning, the suction chamber below the middle corrugation crest of the corrugated cover 2 is subjected to vacuum, the flexible layer 10 and the sheet of asbestos cement 6 resting thereon are drawn in from both sides towards the middle and sucked into the two corrugation troughs on either side of the middle corrugation against the action of the weights 12. At the same time the middle preliminarily bulged strip section 6' of the sheet of asbestos cement 6 is sucked against the middle corrugation crest and fixed since, as already mentioned, an additional suction chamber is arranged below this middle corrugation crest and is subjected to vacuum individually or can be connected with the two adjacent suction chambers.

FIG. 1 shows that the two preliminarily bulged strip sections 6' next to the middle preliminarily bulged strip section 6' are, at the termination of the first corrugating stage, in symmetrical position to the crests of the corrugations of the corrugated cover 2 coordinated with them and stand resting hollow on the flexible layer 10 exactly opposite them.

Figure 1B:
Figure 1C:

If the suction chambers of the suction box 1 neighbouring the middle suction chamber are now subjected to vacuum, the flexible layer 10 with the sheet of asbestos cement 6 resting thereon is drawn in from both sides towards the middle whereas on the corrugation crests of the corrugated cover 2 now becoming operative the preliminarily bulged strip sections 6' are pulled smooth onto said corrugation crests without the asbestos cement material of the sheet 6 being stretched to an excessive extent. At the end of the second corrugating stage, the flexible layer 10 with the sheet of asbestos cement 6 which it is carrying, assumes the position shown in FIG. 1b in relation to the corrugated cover 2. The same procedure is repeated when the next following suction chambers are subjected to vacuum (see FIG. 1c) and also any further suction chambers which must be present if the sheet of asbestos cement 6 is to receive more than five corrugations. The narrow bulged strip sections 6' produced by the preliminary corrugation of the sheet of asbestos cement 6 and projecting upwards from the plane of said sheet produce a surplus in the width of the sheet which is sufficient during each corrugating operation to draw in the sheet of asbestos cement 6 not only with the flexible layer 10 from the outer weight-loaded edges thereof but in addition also a short distance from the opposite side in the regions of the crests of the corrugated cover 2. During this procedure the sheet of asbestos cement 6 carries out a short sliding movement on the flexible layer 10 in the opposite direction to the direction in which the flexible layer 10 is drawn in and the sheet of asbestos cement 6 is thus caused to bear snugly against the crests of the corrugated cover 2 free from stress and expansion.

In the method illustrated in FIGS. 4 and 5, which comes into question as preliminary step especially for the corrugation of extra thick sheets of asbestos cement with a large number of small and very small corrugations, the preliminary corrugation of the sheets is effected by means of a suction die 26 constructed for this purpose. By means of this die 26 the sheet of asbestos cement 6 to be corrugated is transferred on to the flexible layer 10 stretched over the suction box 1 from a feeding device having a smooth upper surface and which may, for example, be a smooth endless conveyor band 22a. The sheet of asbestos cement 6 is carried on the conveyor band 22a, of which only a section of the upper strand is shown in FIG. 4, under the suction die 26 and is picked up by the descending suction die in smooth spread out state. While the suction die 26 is being raised and moved to the suction box 1 located laterally beside the conveyor band 22a, the preliminary corrugation of the sheet of asbestos cement 6 takes place by the application of vacuum successively to the individual suction chambers 27 formed in the suction box 1. The sheet of asbestos cement 6 is then deposited by the suction die 26 on to the flexible layer 10 tightly stretched over the corrugated cover 2 in the manner shown in FIG. 5, in preliminarily corrugated state in which the spacing of the bulged strip sections 6' is also again wider than the spacing of the crests of the corrugations on the corrugated cover 2.

As can be seen from FIG. 5 the preliminarily corrugated sheet of asbestos cement 6 is deposited on the suction box 1 with its middle preliminarily bulged strip section 6' symmetrically opposite the middle sheet-metal strip 2a of the corrugated cover 2 in such a manner that the middle corrugation crest of the preliminarily corrugated sheet of asbestos cement 6 lies in the same vertical plane as the middle corrugation crest of the cover 2 located under the tightly stretched flexible layer 10. The next following corrugation crests of the sheet of asbestos cement 6 assume at the commencement of the corrugating operation positions outwardly displaced in relation to the corrugation crests of the cover 2 coordinated with them, the displacement becoming progressively greater as the distance from the longitudinal central plane of the sheet of asbestos cement 6 increases. The preliminary corrugation of the sheet of asbestos cement 6 are, as can also be seen from FIG. 5, shallower than the corrugated cover 2 which determines the shape of the finished corrugated sheet of asbestos cement 6.

If, after the individual suction chambers 27 of the rigid suction box 1 have been successively placed under vacuum one after the other, the flexible layer 10 is sucked against the corrugated cover 2, the layer 10 drawn in from the two outer longitudinal edges will be brought to bear snugly against the corrugated cover 2 in a similar manner to that explained in detail in connection with the method stages shown in FIGS. 1, 1a, 1b and 1c, in that the sheet of asbestos cement 6 is also drawn in from outside and sucked together with the preliminarily bulged strip sections 6' into the corrugation troughs of the corrugated cover. During this procedure the upwardly bulged longitudinal strip sections 6' of the sheet of asbestos cement 6 also allow a partial drawing in of the sheet of asbestos cement 6 from the middle of the sheet. Hereby the additional width of the sheet of asbestos cement 6 provided for drawing in from the middle is in the case of each individually upwardly bulged longitudinal strip section 6' and in the case of all the longitudinal strip sections 6' taken together, considerably greater than in the case of a sheet of asbestos cement which is preliminarily corrugated only in narrow longitudinal strips using the means shown in FIG. 2.

During the pulling in of the flexible layer 10 together with the preliminarily corrugated sheet of asbestos cement 6 in stages, the upwardly bulged longitudinal strip sections 6' come successively into such a position that their corrugation crests stand exactly or approximately symmetrically opposite the corrugation crests of the corrugated cover 2 in the regions of the suction chambers 27 of the box 1 actually coming into operation.

The suction die 26 according to FIG. 4 is constructed in a similar manner to the suction box 1 described in detail in the patent application mentioned at the beginning. It consists of a sheet-metal box with end walls, longitudinal walls, a cover, and a bottom 28 which is corrugated in a shape corresponding to that of the preliminarily bulged longitudinal strip section 6' of the sheet of asbestos cement to be produced. The internal space of the suction die 26 is divided into a plurality of separate suction chambers 27 by vertical partitions 29 extending parallel to the longitudinal walls of the suction die 26.

The middle section of the suction die bottom 28 consists of a perforated corrugated sheet metal strip 28a extending over two corrugations with a separate suction chamber above the corrugation crests thereof. All the other corrugations of the suction die bottom 28 are formed by rollers 30 fixed or better rotatably mounted on the end walls of the box, and perforated sheet-metal strips 28' bent in trough shape and arranged between these rollers 30.

The bottom 28 of the suction die 26 is covered from below by an air-permeable flexible non-expansible fabric layer 31 the side portions of which are guided upwards over rollers 32. The free ends of the flexible layer 31 are fixed to bars 33 which in turn are hung on projecting edge portions of the die cover by means of tensioning elements such as tension springs 34. These tension springs 34 are fitted with such initial tension that they hold the fabric layer 31 stretched taut and also do not yield when the suction chambers 27 are subjected first to a weak vacuum for the removal of the sheet of asbestos cement 6 from the endless conveyor band 22a.

Two suction cylinder 35 and 36 are mounted on the cover of the suction die 26 transversely to the longitudinal central plane of the die 26. Each of these cylinders is connected to a vacuum generator, such as a suction fan, through the intermediary of a connecting piece 37 or 38. The suction fan coordinated with the suction cylinder 35 produces a weak vacuum whereas the suction fan coordinated with the suction cylinder 36 produces a strong vacuum. As shown in FIGS. 6 and 7, the suction cylinders 35 and 36 are equipped with electromagnetically actuated valves 39 and 40, respectively, which, when open, establish communication between the cylinders 35 and 36 and the individual suction chambers 27 through the intermediary of connecting pieces 41 and 42 respectively, which pass through the cover of the suction die 26. Thus two connecting pieces 41 and 42 lead into each suction chamber 27, one of said connecting pieces being connected up with the suction cylinder 35 and the other with the suction cylinder 36. A second electromagnetically actuated valve 43 is fitted on each of the connecting pieces 41 and serves for connecting the suction chambers 27 temporarily with the outer air.

If the suction die 26 is lowered on to the sheet of fibrous cement 6 brought up by the endless conveyor band 22a, all valves 39 and 40 communicating with the suction cylinders 35 and 36 are closed whereas the valves 43 are open so that all the suction chambers 27 are in communication with the outer air (see valve position I in FIG. 3). After the suction die 26 has been lowered on to the sheet of asbestos cement 6 all the valves 43 are closed and at the same time all the valves 39 opened, whereby, however, the valves 40 remain closed (see valve position II in FIG. 3). As a result all the suction chambers 27 are simultaneously subjected to a slight vacuum which, however, is sufficient to pick up the sheet of asbestos cement 6 from the conveyor band 22a and to hold it firmly below the flexible layer 31 at the bottom 28 of the suction die 26.

While the suction die 26 is being removed from the feeding device embodied in the conveyor band 22a to the corrugating sction box 1, all the suction chambers 27 are successively placed under strong vacuum, commencing from the middle suction chamber followed at each stage always by two suction chambers, one on each side of the middle chamber, in that the valves 40 are opened one after the other at predetermined intervals of time and at the same time always those valves 39 are closed which are coordinated with the suction chambers 27 in which a strong vacuum becomes operative (see valve position III in FIG. 3). Owing to the individual suction chambers 27 being placed under strong vacuum successively at intervals of time, the preliminary corrugating of the sheet of asbestos cement 6 takes place, pulling in the flexible layer 31 against the force exerted by the tension springs 34 which are thereby gradually stretched more and more.

The preliminarily corrugated sheet of asbestos cement 6 is placed on the flexible layer 10 of the corrugating suction box 1 by the descending suction die 26 in the manner already described, in that all the valves 40 are closed at the same time and all the valves 43 are opened simultaneously, as shown in the valve position IV of FIG. 3, which corresponds to the initial position I. All the suction chambers 27 of the suction die 26 are now simultaneously placed in communication with the outer air so that the pressure of the atmospheric air is established at the same time in all the suction chambers 27 and the suction die 26 releases the preliminarily corrugated sheet of asbestos cement 6.

During the lifting of the suction die 26 which has now to be effected, care must be taken that the stressed tension springs 34 are blocked in their stressed positions at least until the ascending suction die 26 with its corrugated bottom 28 and the flexible layer 31 stretched round it are out of the range of the corrugation crests of the preliminarily corrugated sheet of asbestos cement. Otherwise the preliminary corrugation will be destroyed by the prematurely relieved tension springs 34 and the flexible layer 31 being pulled flat thereby.

For temporarily blocking the tension springs 34, an electric controlling device, which must be present in any case for actuating the valves 39, 40 and 43, can be designed in a suitable manner for also carrying out this function. For the sake of simplicity, a mechanically actuated blocking arrangement is shown in FIG. 8, which is intended primarily to make the intended procedure clearly understandable.

The bars 33 (FIG. 4) on which the ends of the flexible layer 31 are anchored, are guided by unround pins 44 in upwardly extending longitudinally slotted rails 45 on the suction die box 26 so that the bars 33 can slide up and down in the rails 45, but cannot turn. The chamfered outer side edges 33' (FIG. 8) of the bars 33 cooperate each with one or more snap arrangements comprising each a snap bolt 47 pressed forward into its operative position by a compression spring 46 and chamfered at its operative end 47' in a direction opposite to that of the bar 33 coordinated with it. The snap bolt 47 and the spring 46 are accommodated in a housing 48 fixed on a pivot lever 49 mounted to turn in a vertical plane about an axle 50 in a housing 51 enclosing the snap arrangement. The free end of the pivot lever 49 is engaged by one end of a tension spring 52 the opposite end of which is attached to the housing 51. The tension spring 52 tends to hold the pivot lever 49 guided between two rails 53, in the initial position shown in FIG. 8, in which the pivot lever bears against a cross-pin or bolt 54 fitted on the guide rails 53.

As the suction die 26 carrying the preliminarily corrugated sheet of asbestos cement 6 sinks onto the corrugating suction box 1, each chamfered bar 33 comes within the range of the snap bolt 47 and presses this back against the force exerted by the spring 46. The pivot lever 49 thereby does not change its initial position because the tension spring 52 coordinated with its is designed to exert a considerably greater force than the compression spring 46 of the snap bolt 47. When the upper side of the bar 33 reaches the height of the lower edge of the snap bolt 47, the snap bolt 47 springs forward and locks the bar 33. In this position, which is shown in FIG. 8, the preliminarily corrugated sheet of asbestos cement 6 has just reached the flexible layer 10 of the suction box 1.

Now if the suction die 26 moves upwards after the valves 43 have been opened, the bar 33 presses against the snap bolt 47 from below so that the pivot lever 49, carrying the housing 48 of the snap bolt 47, carries out a slight turning movement in clockwise direction until the flat underside of the snap bolt 47 has slid outwards along the flat upper side of the bar 33 and the rounded lower front edge 47a of the snap bolt 47 has come within the range of the likewise rounded upper front edge 33a of the bar 33. At this moment the snap bolt 47 springs back and releases the bar 33. This bar 33 is now pulled up precipitately by the tension springs 34 again relieved to their initial tension. The bars 33 arranged on the two sides of the suction die 26 also pull out the flexible layer 31 so that it is again flat over the suction die bottom 28 at a time when the suction die 26 has already been lifted entirely off the preliminarily corrugated sheet of asbestos cement 6 deposited on the corrugating suction box 1. The pivot lever 49 with the housing 48 is returned from the position shown in dot and dash lines in FIG. 8 into its ready position by the tension spring 52 immediately after the bar 33 has passed.

I claim:

1. Method of corrugating prefabricated fresh sheets of asbestos cement on a rigid suction box having a corrugated cover with suction holes, using an air permeable flexible layer yieldably stretched over the corrugated cover and on which a sheet of asbestos cement is placed and sucked against the corrugated cover of the suction box divided into separate suction chambers successively placed under vacuum and thereby corrugated, comprising the steps of providing a sheet of asbestos cement, before it is placed on the flexible layer, with preliminary corrugations the spacing of which is chosen slightly larger than the spacing of the corrugations on the corrugated cover, placing the preliminarily corrugated sheet of asbestos cement on the flexible layer yieldably stretched over the corrugated cover, sucking the flexible layer against the corrugated cover, zone by zone, whereby the sheet of asbestos cement in the regions of the corrugation crests actually to be formed is brought to bear snugly against the corrugation crests of the corrugated cover not only with the flexible layer from the outer longitudinal edges thereof but also partly from the middle strip first sucked against the corrugated cover and then from the corrugations given their finished shape at the preceding application of vacuum, the sheet of asbestos cement thereby sliding on the flexible layer in the opposite direction to the direction in which the flexible layer is drawn in.

2. Method as claimed in claim 1, wherein the fresh sheet of asbestos cement is fed to the suction box on a conveyor band provided with longitudinal ribs for forming preliminarily bulged strip sections in the sheet and is transferred in the preliminarily corrugated state onto the taut flexible layer with the aid of a suction die having on its operative surface trough-shaped longitudinal depressions fitting the strip sections of the sheet of fibrous cement so that the upwardly bulged longitudinal strip sections of the sheet of fibrous cement rest hollow on the flexible layer and their corrugation crests are opposite the corrugation crests of the corrugated cover which effect the formation of the corrugations during the subsequent application of suction.

3. Method as claimed in claim 1, especially for providing a thick walled sheet of asbestos cement with small and very small corrugations, wherein the fresh sheet of fibrous cement is preliminarily provided with corrugations in wide longitudinal strips by a suction die transferring it from a feeding device onto the flexible layer yieldably stretched over the corrugated cover of the suction box and acted upon by suction air successively zone by zone, which corrugations are wider but shallower than the corrugations of the corrugated cover of the suction box.

References Cited by the Examiner
UNITED STATES PATENTS

| 2,586,481 | 2/52 | Rooksby et al. | 25—42 |
| 2,655,196 | 10/53 | Magnani | 156—342 |
| 2,783,175 | 2/57 | Smith et al. | 156—339 |
| 2,915,427 | 12/59 | Schriner et al. | 156—214 |

DONALL H. SYLVESTER, *Primary Examiner.*
MORRIS SUSSMAN, *Examiner.*